(12) United States Patent
Mayfield

(10) Patent No.: US 8,225,476 B2
(45) Date of Patent: Jul. 24, 2012

(54) METHOD AND APPARATUS FOR MANUFACTURING A CATALYTIC CONVERTER

(75) Inventor: David Mayfield, South Bend, IN (US)

(73) Assignee: Hess Engineering, Inc., Niles, MI (US)

( * ) Notice: Subject to any disclaimer, the term of this patent is extended or adjusted under 35 U.S.C. 154(b) by 0 days.

(21) Appl. No.: 12/468,646

(22) Filed: May 19, 2009

(65) Prior Publication Data

US 2009/0282890 A1    Nov. 19, 2009

Related U.S. Application Data

(62) Division of application No. 10/845,282, filed on May 13, 2004, now Pat. No. 7,900,352.

(60) Provisional application No. 60/469,960, filed on May 13, 2003, provisional application No. 60/291,894, filed on May 18, 2001.

(51) Int. Cl.
*B23Q 1/00* (2006.01)
*B23Q 3/00* (2006.01)
*B23Q 7/04* (2006.01)

(52) U.S. Cl. ............. 29/283.5; 29/422; 29/445; 29/508; 72/370.25; 72/19.7

(58) Field of Classification Search ............... 29/407.05, 29/407.08, 422, 445, 469, 508, 514, 520, 29/525, 705, 709, 283.5; 72/370.24, 370.25, 72/387, 415, 31.06, 19.7, 19.6, 51
See application file for complete search history.

(56) References Cited

U.S. PATENT DOCUMENTS

| | | | |
|---|---|---|---|
| 4,060,885 A * | 12/1977 | Hoffman et al. | ............ 29/407.08 |
| 4,519,120 A * | 5/1985 | Nonnenmann et al. | ......... 29/890 |
| 4,969,264 A | 11/1990 | Dryer et al. | |
| 5,055,274 A | 10/1991 | Abbott | |
| 5,096,111 A * | 3/1992 | Ishikawa et al. | ........... 228/173.2 |
| 5,118,476 A | 6/1992 | Dryer et al. | |

(Continued)

FOREIGN PATENT DOCUMENTS

DE      10018804 A    10/2001

(Continued)

OTHER PUBLICATIONS

Final Office Action cited in HESS0009.03 (U.S. Appl. No. 10/845,282) dated Dec. 24, 2008.

(Continued)

*Primary Examiner* — Jermie E Cozart
*Assistant Examiner* — Christopher Koehler
(74) *Attorney, Agent, or Firm* — Faegre Baker Daniels LLP

(57) ABSTRACT

A method and apparatus for manufacturing a catalytic converter is described where the catalytic converter is comprised of an outer tube member having a monolith substrate internally compressed therein with a wrapped mat material surrounding the monolith substrate and intermediate the outer tube. One or more monolith members can be applied within the outer tube and heat shields may also be applied internal to the outer tube and adjacent to the monolith substrate. The assembly of the catalytic converter includes measuring the sequence of compression of the mat material to the monolith substrate in order to understand the possible force characteristics that can be applied during the assembly thereof. The mat material is therefore compressed within the outer tube by way of compression jaws, by compression rollers, by spinning and/or by a shrinker including compression members. The compression of the mat material can be in single or multiple steps.

26 Claims, 16 Drawing Sheets

U.S. PATENT DOCUMENTS

| | | | |
|---|---|---|---|
| 5,273,724 A * | 12/1993 | Bos | 422/179 |
| 5,454,419 A | 10/1995 | Vloedman | |
| 5,479,706 A * | 1/1996 | Tamano et al. | 29/890.08 |
| 5,482,686 A | 1/1996 | Lebold et al. | |
| 5,533,370 A * | 7/1996 | Kuroda et al. | 72/12.5 |
| 5,640,867 A | 6/1997 | Massee | |
| 5,724,735 A | 3/1998 | Ickes et al. | |
| 5,755,025 A * | 5/1998 | Wirth et al. | 29/840 |
| 5,758,532 A | 6/1998 | Massee | |
| 5,775,151 A | 7/1998 | Massee | |
| 5,829,132 A | 11/1998 | Sickels et al. | |
| 5,901,595 A | 5/1999 | Massee | |
| 5,907,898 A * | 6/1999 | Kunieda et al. | 29/517 |
| 5,937,516 A | 8/1999 | De Sousa et al. | |
| 5,943,771 A | 8/1999 | Schmitt | |
| 5,960,661 A | 10/1999 | Massee | |
| 5,980,837 A | 11/1999 | Umin et al. | |
| 6,018,972 A * | 2/2000 | Irie | 72/121 |
| 6,067,833 A * | 5/2000 | Irie | 72/121 |
| 6,162,404 A | 12/2000 | Tojo et al. | |
| 6,195,595 B1 | 2/2001 | Massee | |
| 6,216,512 B1 * | 4/2001 | Irie | 72/121 |
| 6,233,993 B1 * | 5/2001 | Irie | 72/121 |
| 6,295,856 B1 | 10/2001 | Tobimatsu et al. | |
| 6,381,843 B1 * | 5/2002 | Irie et al. | 29/890 |
| 6,389,693 B1 * | 5/2002 | Aranda et al. | 29/890 |
| 6,591,497 B2 * | 7/2003 | Foster et al. | 29/890 |
| 6,591,498 B2 * | 7/2003 | Irie et al. | 29/890 |
| 6,701,617 B2 * | 3/2004 | Li et al. | 29/890 |
| 6,732,429 B2 * | 5/2004 | Houliang et al. | 29/854 |
| 6,732,432 B2 * | 5/2004 | Foster et al. | 29/890 |
| 6,769,281 B2 * | 8/2004 | Irie et al. | 72/121 |
| 6,948,243 B2 * | 9/2005 | Ichikawa et al. | 29/890 |
| 6,954,988 B2 | 10/2005 | Mayfield | |
| 7,047,641 B2 * | 5/2006 | Hardesty et al. | 29/890.08 |
| 7,111,392 B2 * | 9/2006 | Irie et al. | 29/890 |
| 7,137,199 B2 * | 11/2006 | Schug et al. | 29/890 |
| 7,174,634 B2 * | 2/2007 | Morikawa et al. | 29/890 |
| 7,174,635 B2 * | 2/2007 | Irie et al. | 29/890 |
| 7,200,910 B2 * | 4/2007 | Kasten et al. | 29/407.04 |
| 2002/0057997 A1 | 5/2002 | Mizuno et al. | |
| 2002/0057998 A1 * | 5/2002 | Foster et al. | 422/179 |
| 2002/0095787 A1 | 7/2002 | Irie et al. | |
| 2003/0140494 A1 * | 7/2003 | Hardesty | 29/890 |
| 2004/0025341 A1 * | 2/2004 | Li et al. | 29/890 |
| 2006/0150382 A1 * | 7/2006 | Martin | 29/281.3 |
| 2006/0156794 A1 | 7/2006 | Horn et al. | |
| 2006/0272153 A1 * | 12/2006 | Bowman et al. | 29/890 |

FOREIGN PATENT DOCUMENTS

| | | |
|---|---|---|
| EP | 0 681 095 B1 | 11/1997 |
| EP | 0 982 480 B1 | 11/2002 |
| EP | 1 074 704 B1 | 12/2003 |
| JP | 14101052 | 5/1988 |
| JP | 2001-107725 | 4/2001 |
| JP | 2001-526115 A | 12/2001 |
| WO | WO 99/32215 | 7/1999 |
| WO | WO 01/26837 A1 | 4/2001 |

OTHER PUBLICATIONS

Pre-Brief Appeal Conference request cited in HESS0009.03 (U.S. Appl. No. 10/854,282) dated Feb. 19, 2009.

Pre-Brief Appeal Conference Decision request cited in HESS0009.03 (U.S. Appl. No. 10/854,282) dated Mar. 16, 2009.

* cited by examiner

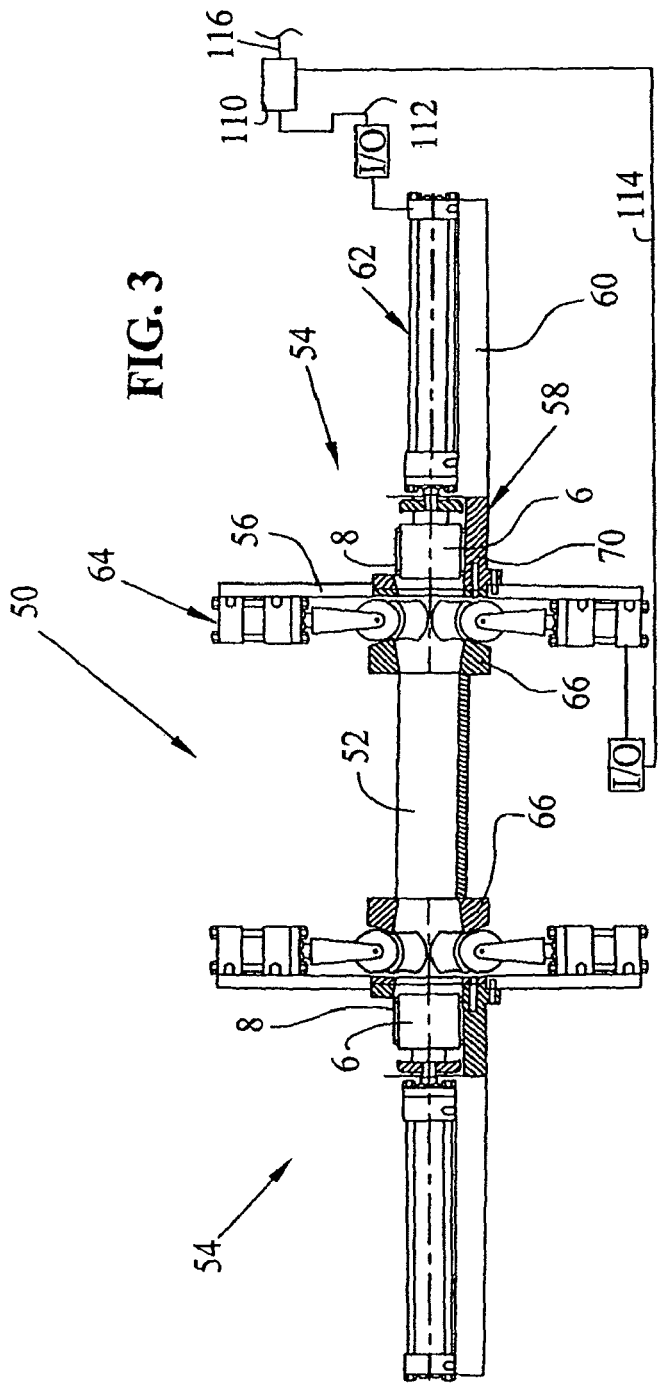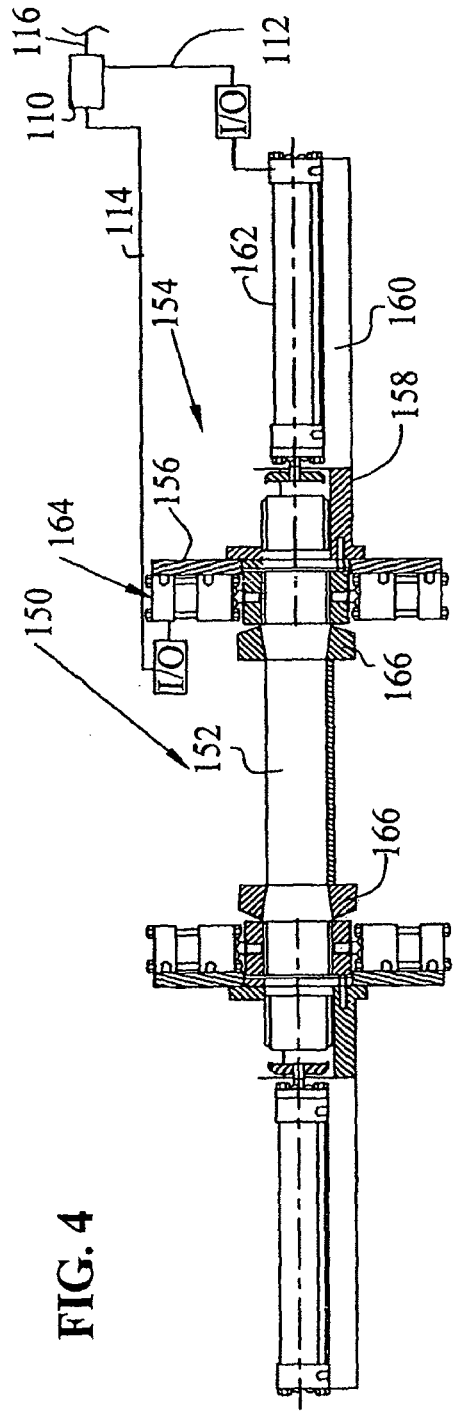

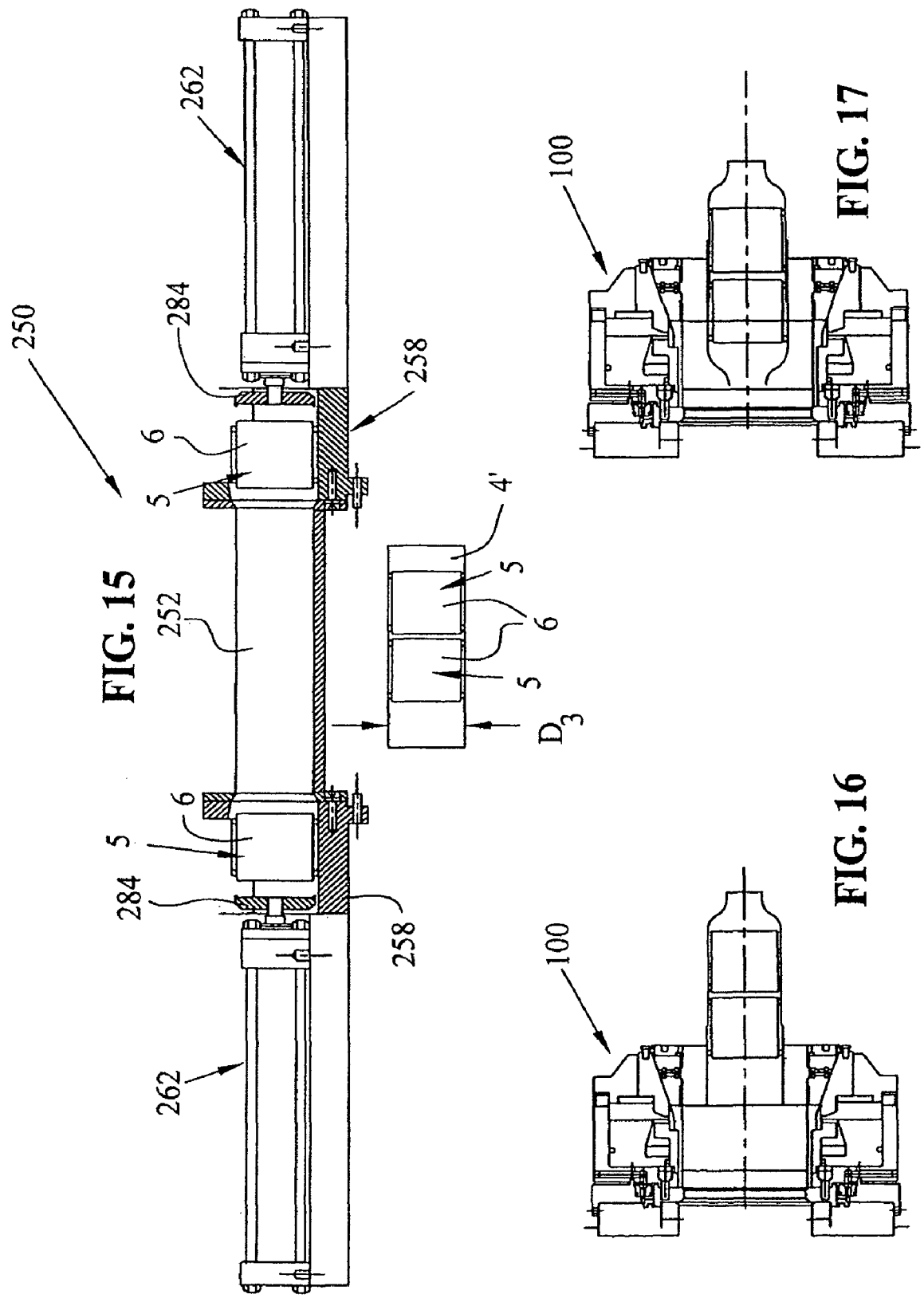

| MAT 1 | MAT 2 | MAT 3 | FORCE (LBS) |
|---|---|---|---|
| 9.3218 | 9.4742 | 8.9662 | 0* |
| 7.493 | 7.1628 | 7.1628 | 10* |
| 6.731 | 6.3246 | 6.1722 | 20* |
| 6.223 | 5.8674 | 5.6388 | 30* |
| 5.842 | 5.461 | 5.3848 | 40* |
| 5.6642 | 5.1943 | 5.2832 | 50* |
| 5.334 | 4.9784 | 5.1689 | 60* |
| 5.1054 | 4.7752 | 4.572 | 70* |
| 4.9784 | 4.6101 | 4.4196 | 80* |
| 4.8514 | 4.4577 | 4.3688 | 90* |
| 4.7244 | 4.3307 | 4.2926 | 100* |
| 4.572 | 4.1783 | 4.1783 | 110* |
| 4.3434 | 4.0894 | 4.0894 | 120* |
| 4.2672 | 3.9878 | 4.064 | 130* |
| 4.0386 | 3.9116 | 4.0005 | 140* |
| 3.937 | 3.81 | 3.8481 | 150* |

*THE PLUNDER WEIGHT IS 1.46 LBS.

FORCE 0-150* 1 DIV = 10 LBS

FIG. 25
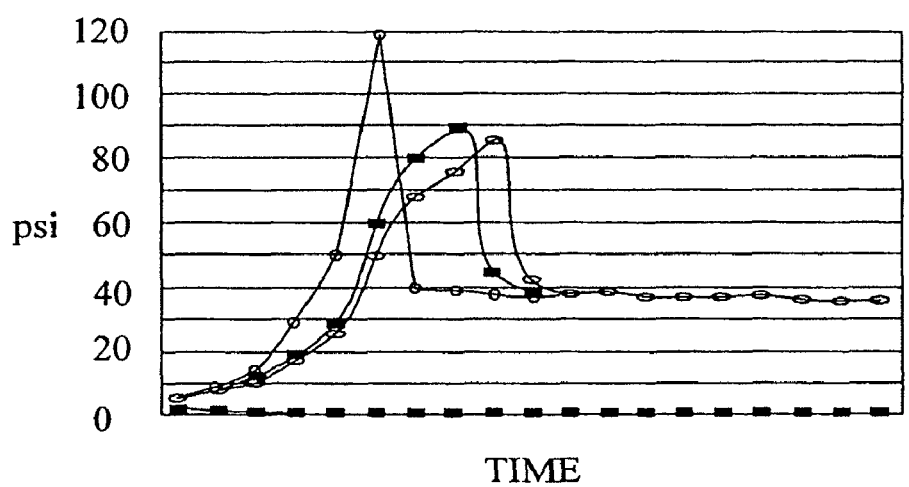
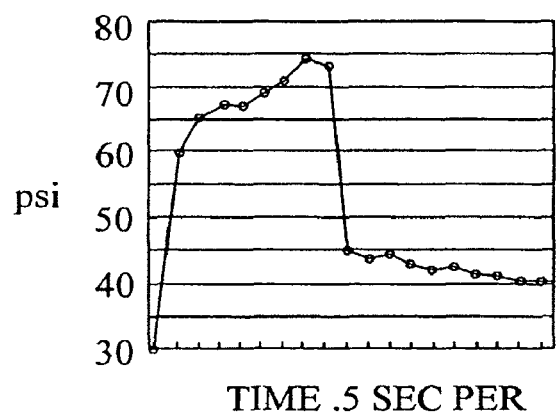
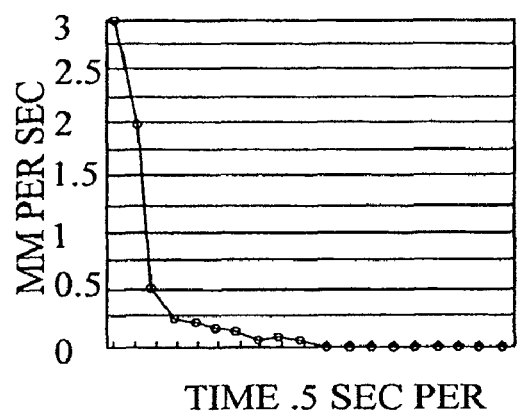
FIG. 26  FIG. 27

METHOD AND APPARATUS FOR MANUFACTURING A CATALYTIC CONVERTER

This application is a Divisional Application of patent application Ser. No. 10/845,282 filed May 13, 2004, which is a Continuation-in-Part claiming the benefit of U.S. Provisional Patent Application Ser. No. 60/291,894 filed May 18, 2001; Regular patent application Ser. No. 10/147,602 filed May 17, 2002; and Provisional Patent Application Ser. No. 60/469,960 filed May 13, 2003, the complete disclosures of which are hereby expressly incorporated by reference.

BACKGROUND OF THE INVENTION

This invention generally relates to the manufacturing of catalytic converters for automotive use.

It is common in automotive applications to require a catalytic converter in the exhaust system of automobiles, typically placed between the engine exhaust manifold and the muffler system of the automobile. As disclosed in U.S. Pat. No. 5,482,686, the catalytic converter normally includes a monolith substrate, a mat material surrounding the monolith substrate, the monolith and mat material then being encapsulated in a metal enclosure which can be a cylindrical tube, a bipartite metal enclosure, or other round or non-round-type metal housing. It is also common to seal opposite ends of the mat material against the internal surface of the metal housing.

One of the requirements of the design is to have the mat material compressed between the outer metallic housing and the monolith substrate. Normal specifications of the catalytic converter require that a minimum pressure exists between the mat material and the monolith substrate, which retain the monolith substrate in place in the outer tube. At the same time, the specifications set a peak pressure on the monolith substrate during manufacture. The purpose of having a peak pressure is that a large force on the monolith substrate tends to fracture the substrate along a transverse face thereof. One of the difficulties in working with such substrates is that several different geometries exist, and different geometries have different fracture characteristics. Moreover, the monolith substrates have a tolerance in their diameter of +3 mm to −1 mm. Thus the deformation alone cannot be measured. Furthermore, it has not heretofore been possible to monitor the manufacturing process in light of such fracture characteristics to enable proper manufacturing of the catalytic converters with the proper load between the mat material and the monolith, without causing fracture of some of the monoliths.

The object of the present invention then is to alleviate the shortcomings present in the market.

SUMMARY OF THE INVENTION

The objects of the invention have been accomplished by providing a method of manufacturing a catalytic converter comprised of an outer tube, a monolith substrate and a mat material surrounding the monolith. The method comprising the steps of establishing the fracture characteristics of the monolith substrate for the combination of the monolith substrate and mat material. A suitable compression sequence is then selected such that the monolith substrate will not fracture, and the mat material is placed around the monolith substrate. The combination of the mat material and monolith substrate is then inserted into the outer tube, and the combination of the outer tube, mat material and monolith substrate are compressed according to the compression sequence so that the monolith substrate is not fractured.

In the preferred embodiment of the invention, the outer tube is radially deformed inwardly to compress the combination of the outer tube, mat material and monolith substrate. One method of radially deforming the tube is by compression swaging of the tube. A second method of radially deforming the tube is by spinning the combination of the outer tube, mat material and monolith substrate, to reduce the diameter of the outer tube.

In either of these alternatives, the mat material and monolith substrate can be partially compressed prior to the deformation step, so as to pre-load the mat material. The mat material and monolith substrate can be compressed together, and then moved longitudinally into the outer tube. This can be accomplished by radial compression at a compression station. Alternatively, the mat material and monolith substrate can be radially compressed by rollers.

Also in the preferred embodiment of the invention, the process includes the further step of necking down the ends of the outer tube to a smaller profile. This can be accomplished by necking the ends down by spinning, such that the ends have diameters smaller than the profile of the remainder of the outer tube. Also preferably, and prior to the spinning step, funnel-shaped heat shields are inserted into opposite ends of the outer tube, and adjacent to the monolith substrate, and the outer tube is spun in order that the ends are spun down to substantially conform to the profile of the heat shield, and retain the heat shield in place.

In another aspect of the invention, a method of manufacturing a catalytic converter comprised of an outer tube, a monolith substrate and a mat material surrounding the monolith, is manufactured by a process where the mat material is first inserted around the monolith substrate. The mat material is then partially and radially compressed against the monolith substrate. The combination of the mat material and monolith substrate is next inserted into the outer tube. Finally, the combination of the outer tube, mat material and monolith substrate are compressed together.

In the preferred embodiment of the invention, the mat material and monolith substrate are together compressed, and then moved longitudinally into the outer tube. This can be accomplished in one of two ways. The mat material and monolith substrate can be radially compressed at a compression station, where substantially all of the mat material is simultaneously radially deformed. Alternatively, the mat material can be radially compressed by rollers, where the mat material and monolith substrate are moved longitudinally through a roller station, whereby the mat material is sequentially compressed as it moves through the rollers, and the combination of the mat material and monolith substrate are moved longitudinally into the outer tube.

The tube must also be compressed. The tube can be radially deformed by compression swaging. Alternatively, the tube may be radially deformed by spinning the combination of the outer tube, mat material and monolith substrate, to reduce the diameter of the outer tube.

The ends of the tube can also be necked down to a smaller profile, somewhat funnel-like. The ends of the tube may be necked down by spinning, such that the ends have diameters smaller than the profile of the remainder of the outer tube. Also in one embodiment, prior to the spinning step, funnel-shaped heat shields are inserted into opposite ends of the outer tube, and adjacent to the monolith substrate, and the outer tube is spun in order that the ends are spun down to substantially conform to the profile of the heat shield, and retain the heat shield in place.

The present invention further includes shrinkers for compressing the outer tube prior to the spinning process, discussed above. The shrinkers disclosed herein provide a compression force at discreet areas along the length of the tube. In one embodiment, the shrinkers include pie shaped compressing members with an arcuate surface contacting the tube during compression. In another embodiment of the invention, the shrinker includes a plurality of compressing members having a circular cross-section wherein the arcuate surface of the compressing member contacts the tube at discreet positions along the tube.

In still another embodiment of the invention, the shrinker allows for deformation of the tube to be altered, as needed, at any longitudinal position of the tube. For example, when processing a plurality of bricks with different facts or characteristics, the deformation performed by the shrinker may be varied in accordance with the variations in the characteristics of the different bricks.

Also, an embodiment of the invention may be coupled with the gauge apparatus measuring the characteristics of the bricks during loading. These size characteristics allows the compression force applied to various loaded tubes to be altered in accordance with the properties of the mat material and monolith contained within the tube and recorded by the gauge apparatus.

BRIEF DESCRIPTION OF THE DRAWINGS

The preferred embodiment of the invention will now be described with reference to the drawings where:

FIG. 3 shows a first embodiment of a gauge apparatus for loading monolith substrate into the catalytic converter tubes;

FIG. 4 is a second embodiment of gauge apparatus similar to that of FIG. 3;

FIGS. 15 through 17 show another alternative version of assembling the catalytic converter;

FIG. 25 shows the estimated pressure versus time data for a constant velocity shrinking;

FIG. 26 shows the pressure on monolith with a variable velocity shrinkage; and

FIG. 27 shows the shrinkage velocity versus time.

DETAILED DESCRIPTION OF THE INVENTION

Figure 1:
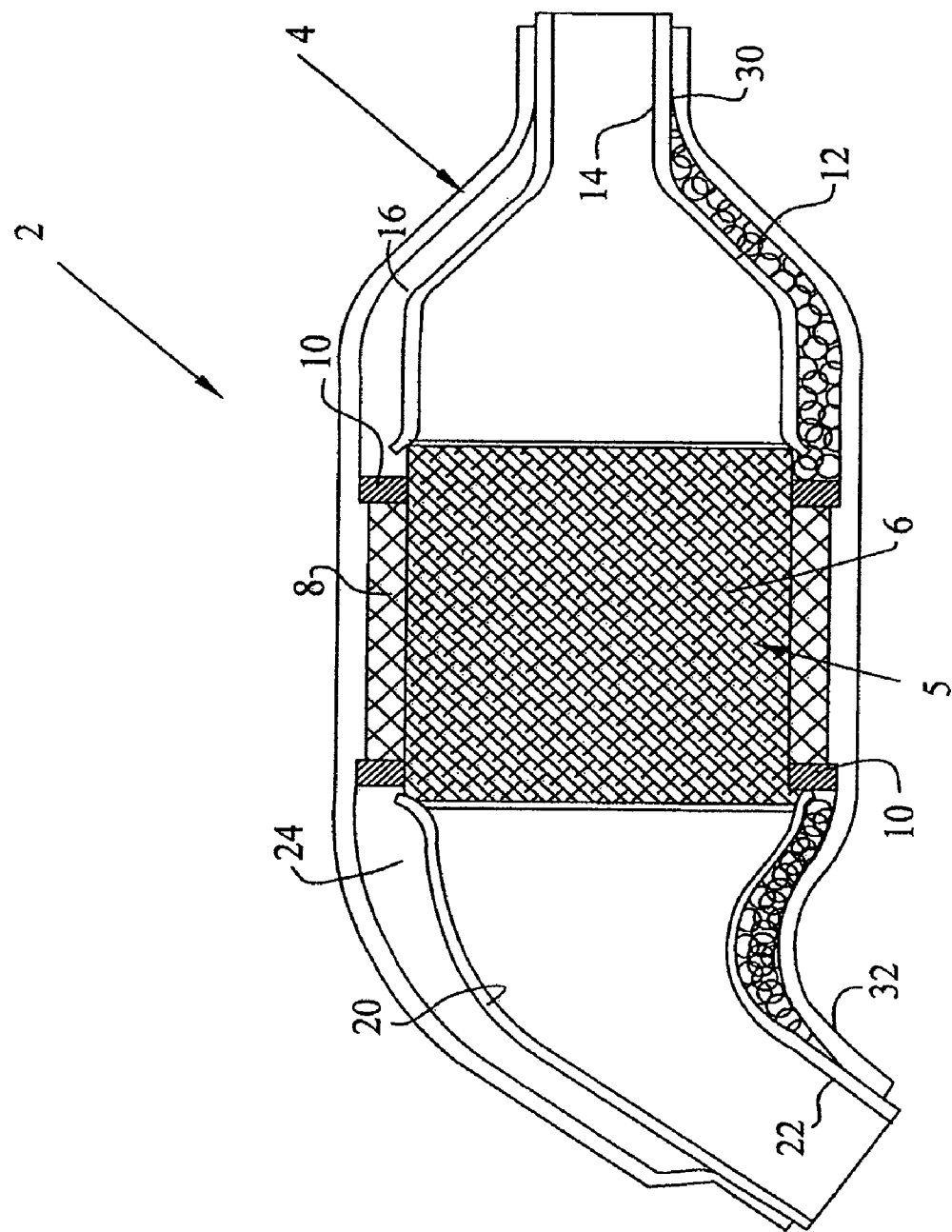
FIG. 1 depicts one embodiment of a catalytic converter as manufactured by the present method.

With reference first to FIG. 1, an example of a catalytic converter manufactured according to the process of the present invention is shown generally at 2, and includes an outer tube member 4, a monolith substrate 6, a mat material 8 with end seal members 10. The catalytic converter 2 can also optionally include a first heat shield member 12 having a necked-down section 14, thereby forming an internal air gap at 16. The catalytic converter 2 can also include a second heat shield member 20 having a necked-down section 22 forming an air gap at 24. It should be appreciated to those skilled in the art that the mat material 8 can either be a stainless steel mesh-type material, or can alternatively be a nonflammable, fibrous-type material. In either case, the mat material 8 is compressible but, when compressed in the combination of the monolith 6, mat material 8, and outer tube 4, causes a force transfer from the mat material to the monolith substrate 6, and an equal reaction force against the inner wall of the outer tube 4.

Figure 2:
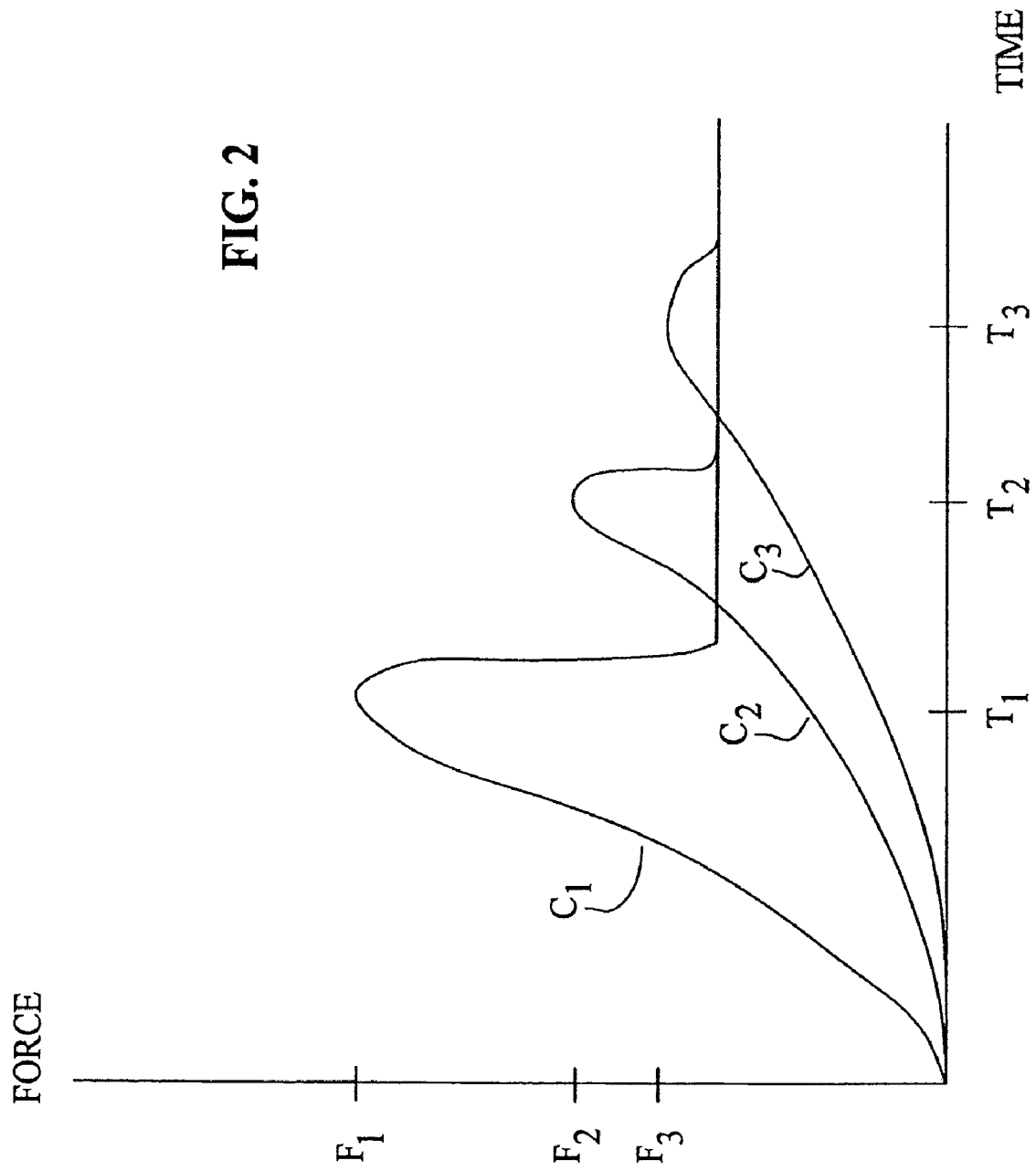
FIG. 2 shows a hypothetical force curve versus various times for compression of the mat material.

With reference now to FIG. 2, a force-vs.-time curve is depicted, where the Y axis represents force transmitted between the mat to the monolith, whereas the X axis shows various times, that is, the time for the compression of the mat material (assuming the same depth of compression). Thus, the first curve $C_1$ shows that, if the mat material is compressed quickly, that is, within $T_1$ seconds, the peak force is reached quickly, that is, to $F_1$, where $F_1$ may be greater than the force required to shear the monolith substrate, or may cause a pressure higher than that allowed by the manufacturer. However, if the mat material is compressed over a longer period of time and to the same deformation, but within a longer period of time, that is, to $T_2$ seconds, a lower peak force $F_2$ is reached. Finally, if the mat material is compressed to the same deformation over yet a longer period of time, that is, over $T_3$ seconds, a peak force of $F_3$ is reached. It should be appreciated that any number of times and deformations can be applied and accommodated, all dependent on the end result which is desired.

Thus, for every different monolith geometry, the peak force for fracturing of the monolith substrate may be measured such that the pressure against the monolith substrate in psi never exceeds a maximum threshold during manufacturing. For any given monolith substrate and manufacturing specifications, the cycle time can be minimized to the most efficient process. Also, according to the process described, the force and/or pressure can be measured, and the process is repeatable.

For example, a common or typical manufacturing specification for a catalytic converter would require that a minimum pressure of 30 psi exist between the mat material and the monolith substrate after the completion of the manufacturing process, yet that during the manufacturing process, the peak pressure between the mat material and the monolith substrate never exceeds 100 psi. Thus, for this given manufacturing specification, and by knowing the fracture pressure according to the testing discussed in relation to FIG. 2, the manufacturing process can be formulated such that the manufacturing time for compressing the mat material is held to a minimum, thereby reducing cycle time, yet ensuring that during the manufacturing process, the monolith never fractures or is subjected to a pressure higher than the set engineering specifications. It should also be understood that for any of the force curves $C_1$-$C_3$, a multiple-step process is possible. In other words, the compression which takes place between the mat material and the monolith substrate can either be a one-step process or can be various steps, where the combination of the subcomponents are moved from station to station.

With reference first to FIGS. 3, 5, and 7-8, a process according to one version of the invention will be described. With reference first to FIG. 3, a loading device 50 for loading the monolith substrate 6 wrapped with the mat material 8 will be described. The device 50 comprises a central U-shaped loading section 52 for positioning of the outer tube, and includes gauge devices 54 mounted at opposite ends of the U-shaped loading section. The gauge devices shown generally at 54 will now be described, and it should be understood that the devices 54 are identical but mirror images of each other, so that only one such device will be described. It should be understood that the gauge members will both assist in the insertion of the mat material and monolith in the outer tubes, but will also measure the force and/or pressure which the mat material is exerting on the monolith substrate 6.

As shown in FIG. 3, the gauge device 54 generally includes a vertical platen portion 56, a bracket portion 58, which is attached to the platen 56, and includes as a further extension thereof, the cylinder stand 60. A cylinder mechanism 62 is positioned on the cylinder stand 60 as will be described further herein. The device 54 further includes a plurality of pressure roller assemblies 64, which, in the preferred embodiment, are disposed in a radial array around a tapered lead-in member 66. With respect now to FIG. 5, the insertion device 54 will be described in greater detail. The bracket member 58 includes a vertical wall portion 68 and a U-shaped wall portion 70 having side wall portions at 72. The vertical wall portion 68 includes an opening at 74, which feeds into a tapered opening at 76 and thereafter towards the pressure roller assemblies 64 as will be described herein.

Figure 5:
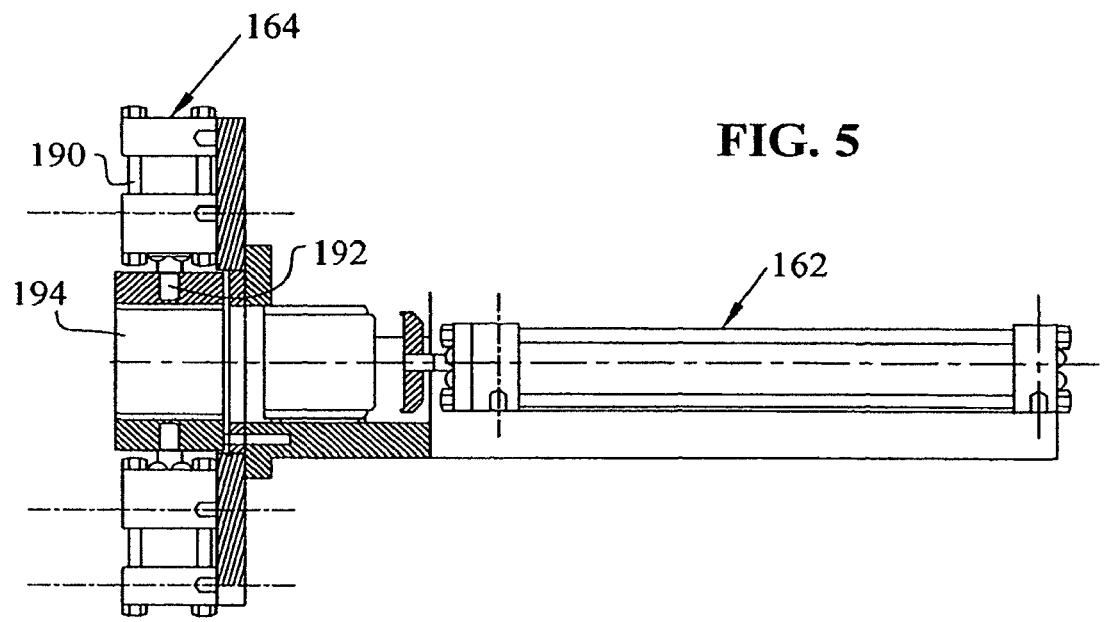
FIG. 5 is an enlarged version of the gauge apparatus of FIG. 3.

With reference now to FIG. 5, the cylinder mechanism 62 could either be a pneumatic or hydraulic cylinder, and includes a cylinder portion 80 having a rod portion 82 and a pusher section at 84. As shown, the pusher section 84 is positioned within the U-shaped wall 70 and substantially axially aligned with the tapered opening 76. Finally, the pressure roller assemblies 64 also include cylinder portions 90 having a rod portion 92 operatively connected to rollers 94. It should be appreciated that the rollers 94 are contoured with an arcuate shape (as best viewed in FIG. 3) such that with their radial alignment and the conformance of the arcuate shapes of the rollers 94, are substantially profiled in a circular manner.

Figure 7:
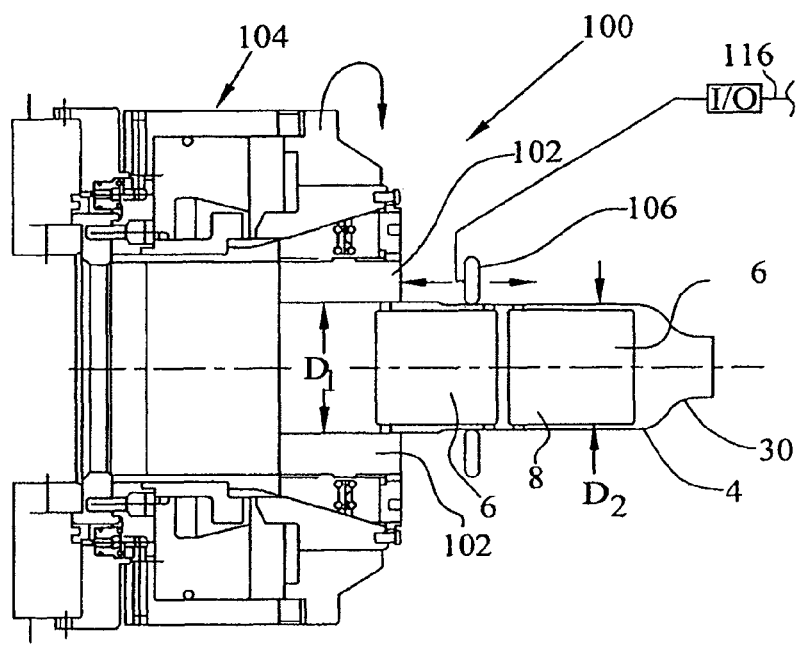
FIG. 7 shows an apparatus for further reducing the diameter of the outer tube and the first process step thereof.

With reference now to FIG. 7, a spinning apparatus is generally shown at 100 including chuck jaws 102, which are common in the art of spinning. These chuck jaws move on a radial line so as to retain a circular member for spinning. The chuck head 104 generally rotates in a clockwise position as viewed at the front of the head and as depicted by the rotational arrow in FIG. 7. Meanwhile a pressure roller 106 (held by a pressure arm, not shown) can be pressed against the outside of the contour of the tube 4 for spinning purposes, and itself is held on a rotational axis and is a driven roller, not a drive roller. Pressure roller 106 is movable along the longitudinal axis bi-directionally as depicted by the arrows in FIG. 7, and is movable inward radially, thereby changing the diameter of the item being spun.

With reference now to FIGS. 3, 5, 7, and 8, a first method of producing a catalytic converter according to the present invention will be described. With reference first to FIG. 3, an outer tube, such as item 4 which in this stage is simply a straight cylindrical tube, can be placed within the U-shaped portion 52, such that the ends of the tube are aligned with lead-in members 66. Monolith members 6 with wrapped mat material 8 are then placed within U-shaped wall members 70 aligning them with the cylinders 62. At this point, reference is again made to FIG. 2 to recall that the speed of the deformation of the mat material will determine the force and pressure characteristics being placed on the monolith substrate.

Thus, as should be appreciated, a control mechanism 110 will be included to control the speed of both the cylinder 62 and pressure roller assemblies 64, and to record the force/pressure on the monolith. The pressure roller assemblies 64 are activated to cause inward radial movement of the various rollers 94. Input data, for example through cable 112, will be used to control the radial movement, and thus the compression. At the same time, output data will be gathered in the way of force data to ensure that the peak pressure is not exceeded, and to know the force which has been exerted, and the diameter at which this force was measured. This output data is fed forward to the control mechanism, and then to the spinning apparatus to ensure that the entire process is within spec. Input/output data will be used to both control and measure the cylinder 62 and the resultant speed of the cylinder rod 82 and pusher member 84. Thus the speed of the pusher member 84 will determine how quickly the mat material 8 is compressed vis-à-vis the tapered opening 76 and plurality of rollers 94.

Further compression exists at the tapered members 66 and during entry of the mat material into the outer tube member 4. Input/output data, for example through cable 114, both captures and controls the pressure exerted by rollers 94. However, all of the compression and force characteristics of the monolith substrate can be predetermined such that the only variable to the process for control is the speed of the cylinder rod 82, such that identical results are continuously reproduced in a manufacturing setting with commercially acceptable cycle times. This data is also fed forward to the control mechanism and thereafter on to the spinning apparatus. In this particular example, the combination of the mat material and the monolith are described to be further compressed upon insertion into the outer tube. It should be understood that it is immaterial whether or not the tube inner diameter is the same size as that compressed, smaller or larger. What is relevant, is the diameter to which the combination of the mat material and monolith are compressed, and the force/pressure at that point. This will be described further herein.

As can be viewed in FIG. 3, two monolith substrates are simultaneously inserted from opposite ends of the outer tube 4 tube to position two monoliths adjacent to each other. However, it should be understood that the number of monolith members is immaterial to the invention, such that a plurality of monolith members could be inserted or a single elongate monolith substrate could be installed.

Figure 8:
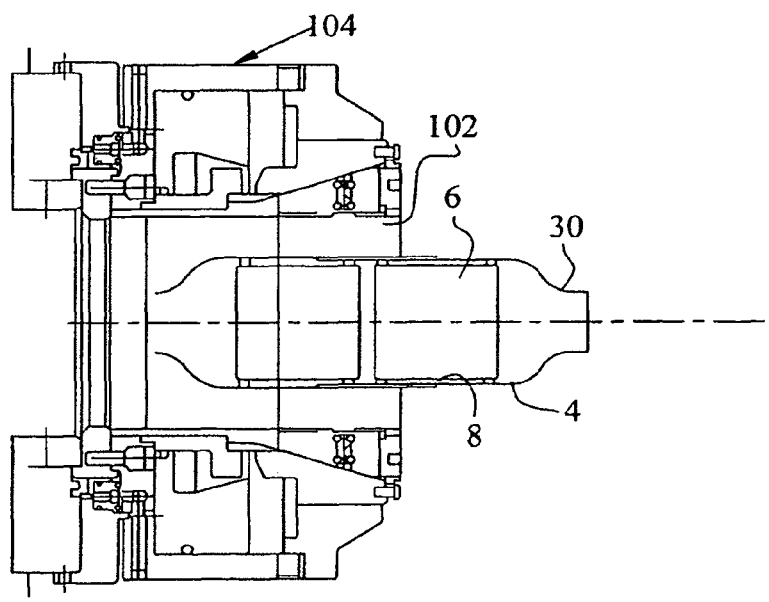
FIG. 8 is similar to FIG. 7 showing the follow-up dimensioned reduction step.
Figure 9:
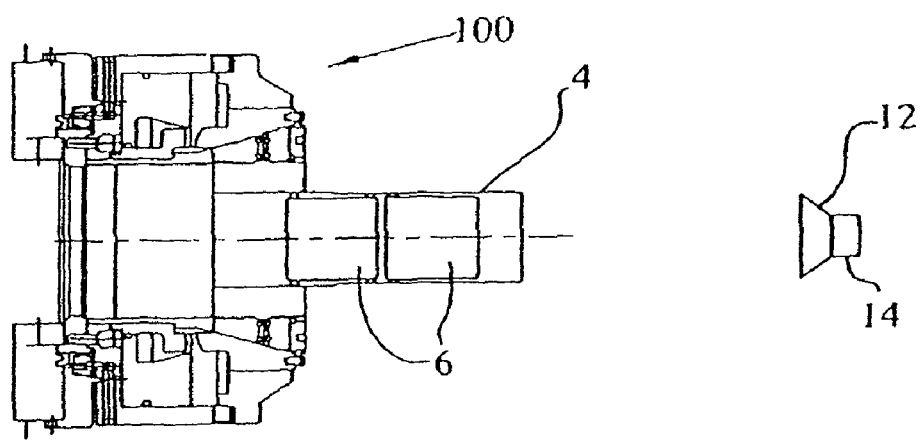
FIGS. 9 through 14 show an alternative embodiment sequence of method steps where a heat shield can also be placed in the catalytic converter and held in place at both ends by the method steps.
Figure 10:
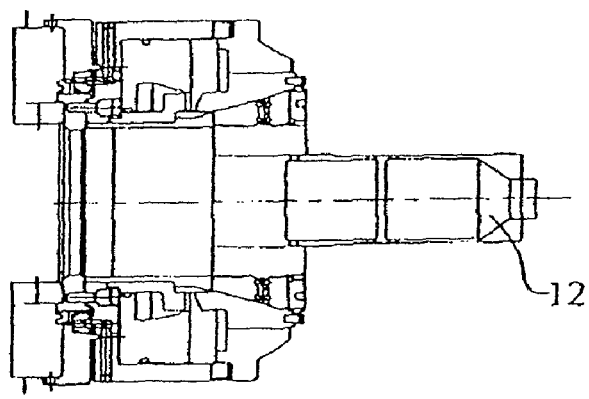

It should be appreciated at this point in the process cycle that the two monolith members are pre-installed and pre-stressed within the outer tube 4 and can be removed from the U-shaped member 52 and moved to the spinning apparatus depicted in FIGS. 7 and 8. It should also be appreciated that, given the pre-stress between the mat material and the monolith substrate within the outer wall 4, the mat material does not have the adequate pressure on the monolith and therefore the force of the mat material and the resultant pressure is only partially up the force curves $C_1$, $C_2$ or $C_3$. At the same time, while the complete force/pressure is not yet exerted, the input/output data from both the cylinder 62 and pressure roller assemblies 64 has been fed forward to the control mechanism through respective cables 112, 114, and hence will control the remainder of the spinning process in accordance with the selected curve of FIG. 2.

With reference now to FIG. 7, the combination of the outer tube 4, the monolith substrate 6, and the mat material 8 is inserted into the spinning apparatus 100 and captivated within the jaws 102. According to the spinning process, then, the spinning head 104 begins to spin to its full speed, whereby the pressure roller 106 begins to exert pressure on the outer tube 4 at the front end of the tube, that is, the tube end extending out of the head 104. As shown in FIG. 7, the spinning process can reduce the diameter of the outer tube from the diameter $D_1$, that is, its original diameter to diameter $D_2$, as well as provide the constricted end 30. This entire process, both the radial depth as well as the axial speed, is accomplished according to the input data, fed forward from the control mechanism through cable 116.

It should be appreciated that in the process step of FIG. 7, that due to the fact that the outer tube 4 is chucked up within the spinning head 104, the entire length of the outer tube cannot be spun in this step. Rather, after the tube is spun to approximately the configuration shown in FIG. 7, the spinning head 104 is stopped, the partially spun outer tube is removed from the head and flipped around to insert the completed portion of the outer tube into the head, whereby the remainder of the outer tube is spun to the same dimension as that previously spun. It should also be appreciated that the spinning process, that is, taking the diameter from diameter $D_1$, to diameter $D_2$ also compresses the mat material between the outer tube and the monolith substrate. It should also be appreciated that the time of compression, that is, in accordance with the FIG. 2 force vs. time of curve, is calibrated as it relates to the axial speed of the roller 106 as it relates to the spinning process. Said differently, the faster the axial speed of the movement of the roller 106 in the spinning process will determine whether the force characteristics of the mat material on the monolith substrate follows curves $C_1$, $C_2$ or $C_3$.

It should be noted that dependent upon the desired application, the above steps need not be carried out in the order set forth above. For example, if desired, the spinning step may be undertaken after loading, thereby elongating the filled outer tube 4 and then the shrinking step may follow. Likewise, a partial spin may be undertaken necking an end of the tube 4 followed by a compression run which is then followed by a second spinning step to complete the necking procedure.

Figure 6:
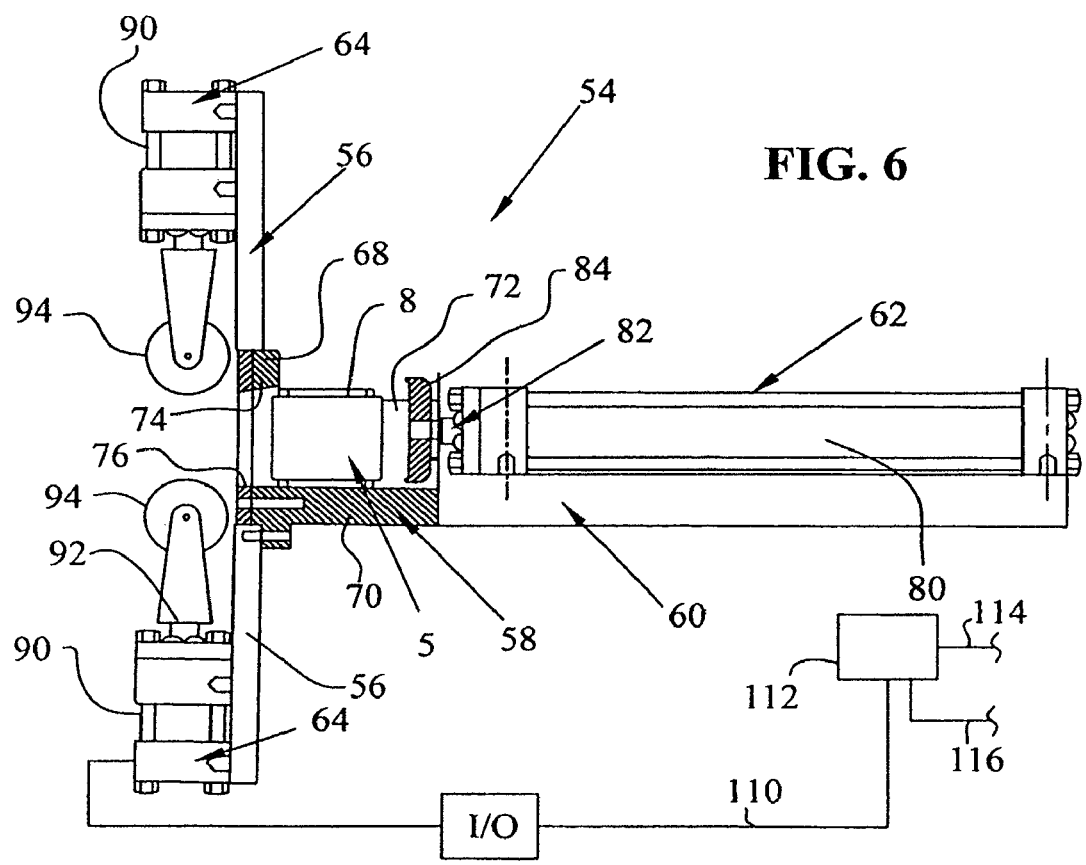
FIG. 6 is an enlarged view of the gauge apparatus shown in FIG. 4.

With reference now to FIGS. 4 and 6, an alternate method of manufacturing the catalytic converter will be described. As shown in FIG. 4, the insertion mechanism 150 generally includes U-shaped tube holder 152 and an insertion mechanism 154 mounted to opposite ends of the U-shaped holder 152. The U-shaped holder generally includes a vertical platen 156, a bracket member 158, a cylinder stand 160, and a hydraulic cylinder 162. The vertical platen 156 holds compression members 164. With reference now to FIG. 6, the member 164 includes a pneumatic cylinder 190 having rods 192 attached to semi-cylindrical pressure jaws 194. These pressure jaws are aligned with tapered lead-in members 166 and with U-shaped tube holder 152.

The mechanism 150 of the FIG. 4 embodiment is also usable with the identical spinning mechanism 100 shown in FIGS. 7 and 8 according to the following processing. An outer tube 4 is first placed in the U-shaped holder 152, and the cylinders 162 first move the monolith substrates and mat material into their respective compression jaws 194. When the monolith substrates are laterally aligned within the compression jaws 194, the cylinder 190 is activated which causes a compression of the mat material surrounding the monolith substrate. Once again this compression and the time thereof is made in accordance with the selected compression sequence, that is, according to one of the illustrative curves $C_1$ $C_2$ or $C_3$. When the mat material is compressed to its proper position, the cylinders 162 are again activated moving the monolith substrate through the tapered members 166 and into the outer tube. At this point, the loaded outer tube 4 and monolith members are moved to the spinning device of FIGS. 7 and 8 and processed in the same manner as mentioned above. It should be appreciated that input/output data is again used in the manner as previously described with respect to the prior method.

Figure 11:
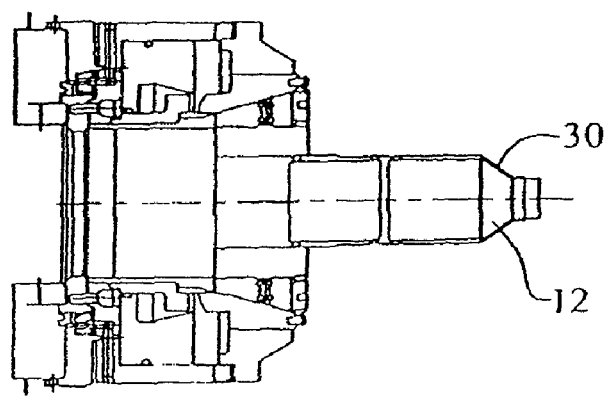
Figure 12:
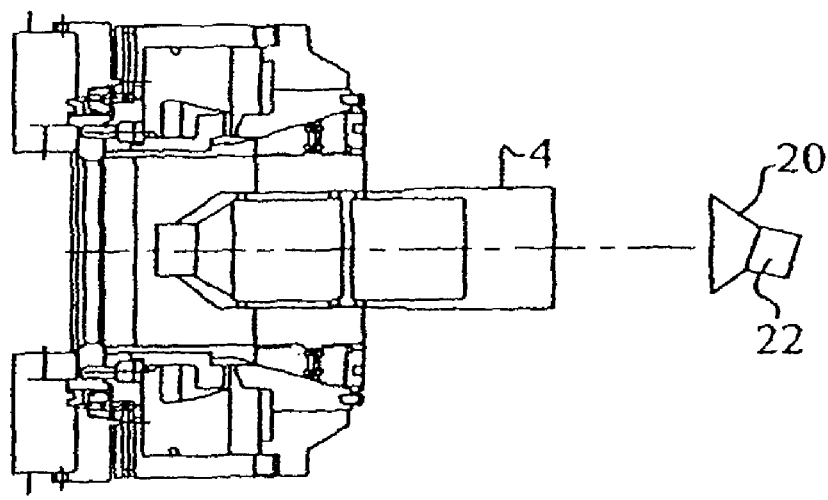
Figure 13:
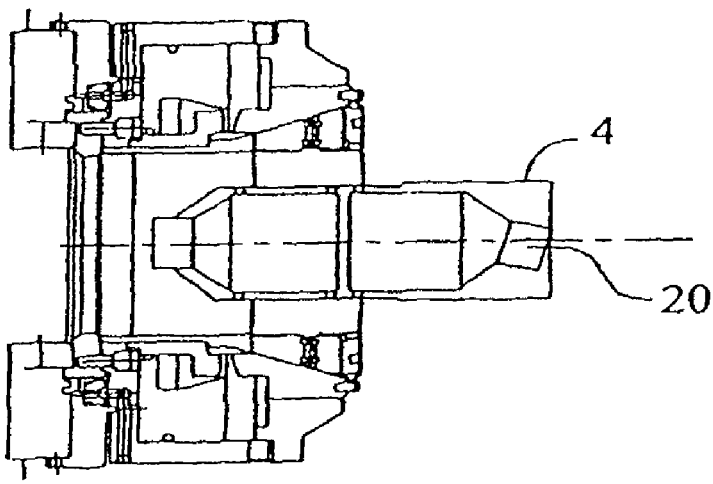
Figure 14:
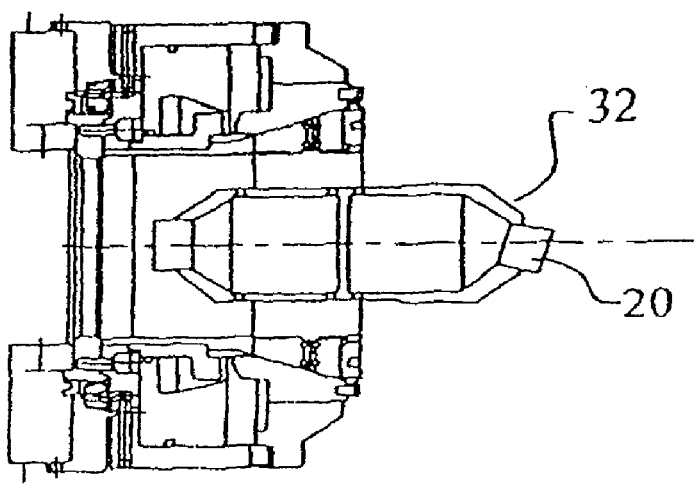

With reference now to FIGS. 9 through 14, an alternate embodiment of the spinning process will be described where internal heat shields such as items 12 and 20 are desired internal to the outer tube. As first shown in FIG. 9, the heat shield 14 can be inserted into the open end of the outer tube 4 adjacent to a first monolith member to a position shown in FIG. 10. As shown in FIG. 11, the spinning process can begin and spin the extended part of the outer tube such that a tapered portion 30 is tapered to a substantial profile to that of the heat shield 12 to conform thereto. As in previous spinning steps, the partially completed spun outer tube is turned 180° to the position shown in FIG. 12 to receive the other heat shield member 20 and is inserted into the outer tube 4 to the position shown in FIG. 13. The spinning process continues to spin both the outer diameter of the outer tube as well as to spin tapered section 32, which lies adjacent to the heat shield 20.

With respect now to FIGS. 15 through 17, another possible method according to the invention is disclosed including a loading apparatus 250 including cylinder assemblies 262 arranged at opposite ends of bracket members 258, however, where no pre-compression by way of compression rollers or compression jaws takes place. Rather, the monolith members 6 are moved into the intermediate portion of outer tube member 4', where the diameter $D_3$ of outer tube 4' is slightly larger than $D_1$. The pre-assembly of outer tube 4' together with the monolith members 6 may now be moved to the spinning apparatus 100 as shown in FIGS. 16 and 17 and spun according to one of the force compression sequences disclosed in FIG. 2. It should be appreciated that, due to the fact that very little pre-stress is applied between the mat material and the monolith, all of the compression force, that is, the entire curve of force curves $C_1$, $C_2$ or $C_3$, will be applied by the spinning process of FIGS. 16 and 17.

While the method is shown only with respect to round or cylindrical tubes, non-round tubes are also possible. In this case, the insertion apparatus would include a modified compression jaw similar to that shown with respect to FIGS. 4 and 5, with compression jaws sized to conform to the non-round items. A further compression of the entire outer tube would also be used, where the incremental compression completes the mat compression cycle. This device could be used for either round or non-round tubes, and a round tube version is more particularly referred to in FIGS. 18-22.

Figure 19:
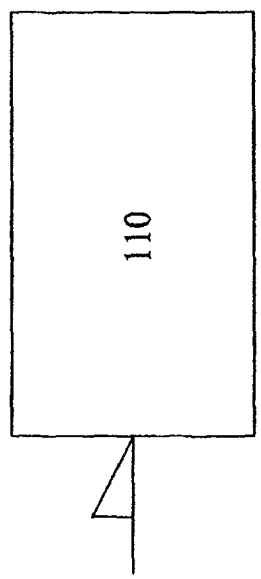
FIGS. 18-22 show yet another alternative embodiment of apparatus for reducing the diameter of the outer tube, where the outer tube is comprised of shrinking dies.
Figure 18:
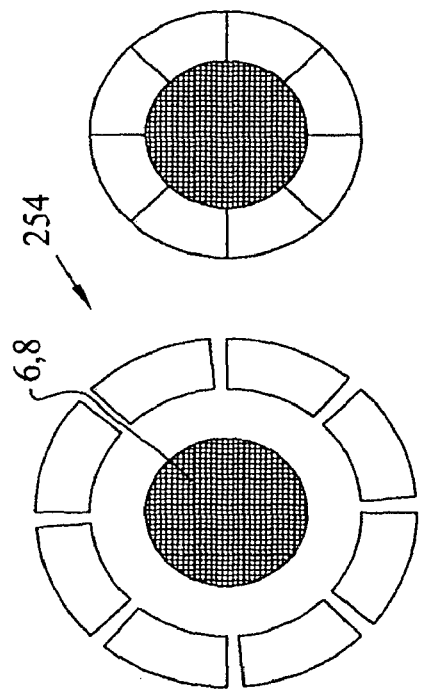
Figure 22:
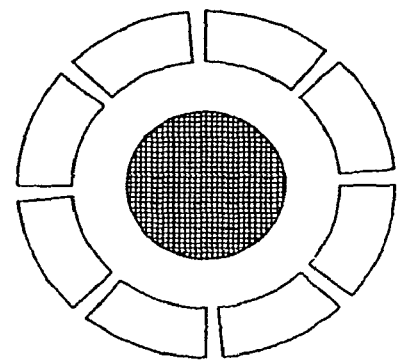
Figure 21:
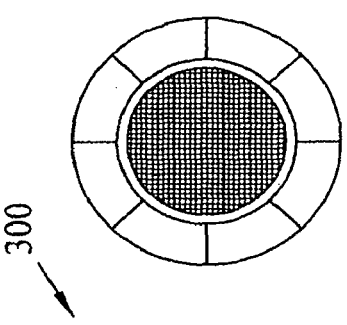
Figure 20:
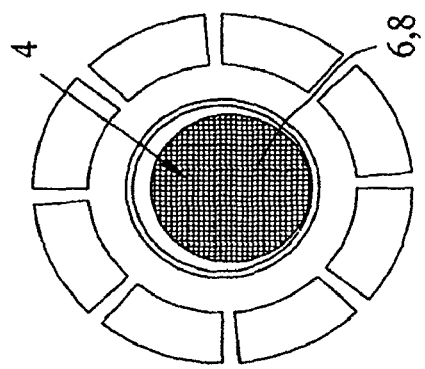

With respect first to FIG. 18, a gauge member 254 is shown diagrammatically which receives a combination of the mat material and monolith 6, 8 and as shown in FIG. 19 compresses the combination of the mat and monolith to a certain compression. This information, that is, the force exerted from the monolith back to the gauge dies as well as the diameter to which the combination of the mat material and monolith is compressed is fed to the control mechanism 110. This information is fed forward to shrinking dies 300, whereby the combination of the mat material and monolith 6, 8 can be placed within an outer tube 4 and positioned within the shrinking dies 300. Given the information fed forward from the gauge 254, that is, the pressure exerted on the gauge (which will coincide with the force exerted on the monolith material) together with a diameter to which the mat material has been compressed, and together with the specific force characteristic of the specific mat material used, the shrinking die 300 can determine exactly to what further compression the combination of the outer tube 4 needs to be compressed.

Figures 23, 24:
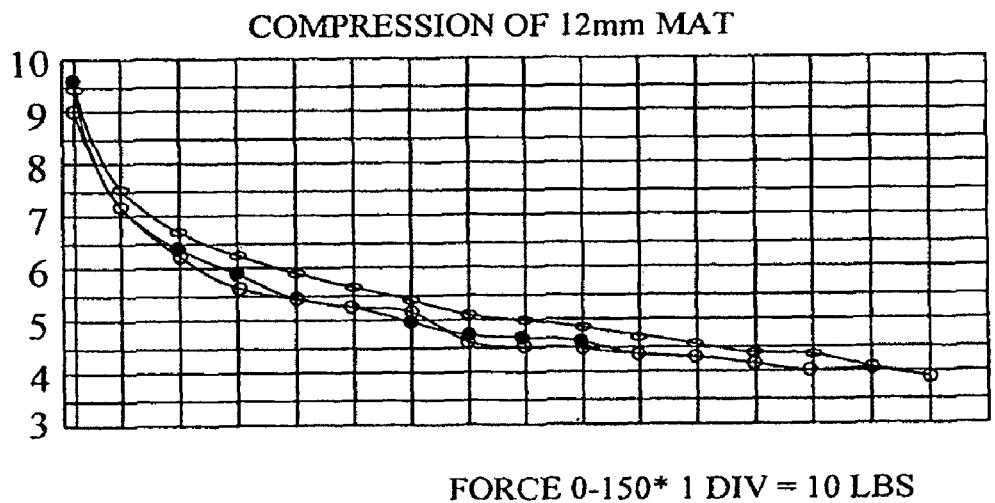
FIG. 23 is a chart showing the deformation for three different mat materials to achieve various levels of force.
FIG. 24 shows the curve of the three mat materials of FIG. 23.

For example, as shown in FIG. 23, three different mat materials were tested to determine to which dimension they need to be compressed in order to achieve a given force. FIG. 24 shows the dimensions to which the 12 mm mat material was compressed to achieve these various forces.

FIGS. 25-27 also show estimated data for a particular mat material, where FIG. 25 shows the pressure versus time on the mat material given three different constant velocities of deformation. However, if the acceleration of the deformation decreases, for example, according to FIGS. 20-22, then as shown in FIG. 26, the peak pressure can be eliminated by decelerating the shrinking dies so as to totally eliminate the spike in a pressure curve of FIG. 25. This deceleration is shown more particularly in FIG. 27.

Figure 28:
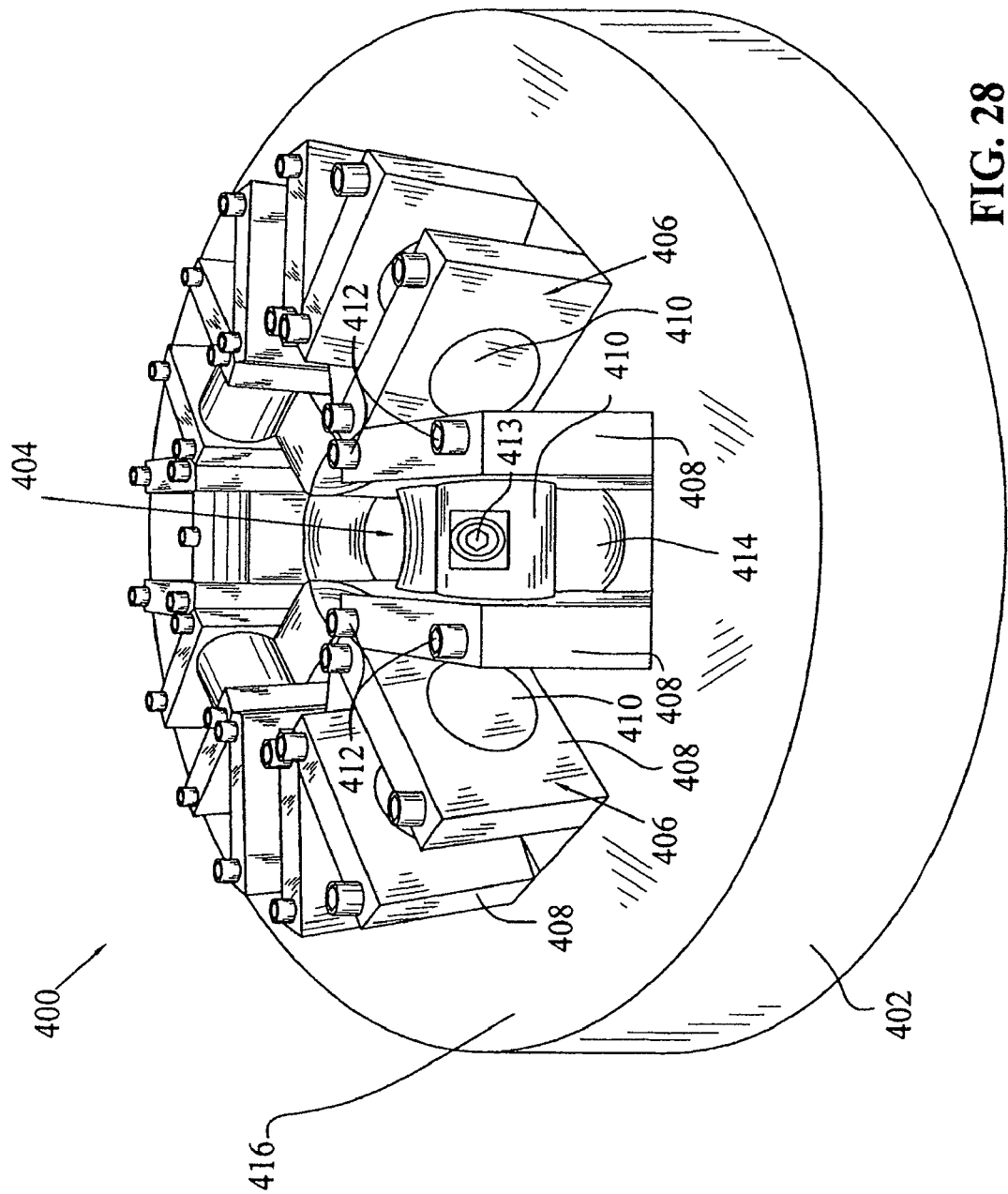
FIG. 28 shows a perspective view of an embodiment of a shrinker in accordance with the present invention.
Figure 29:
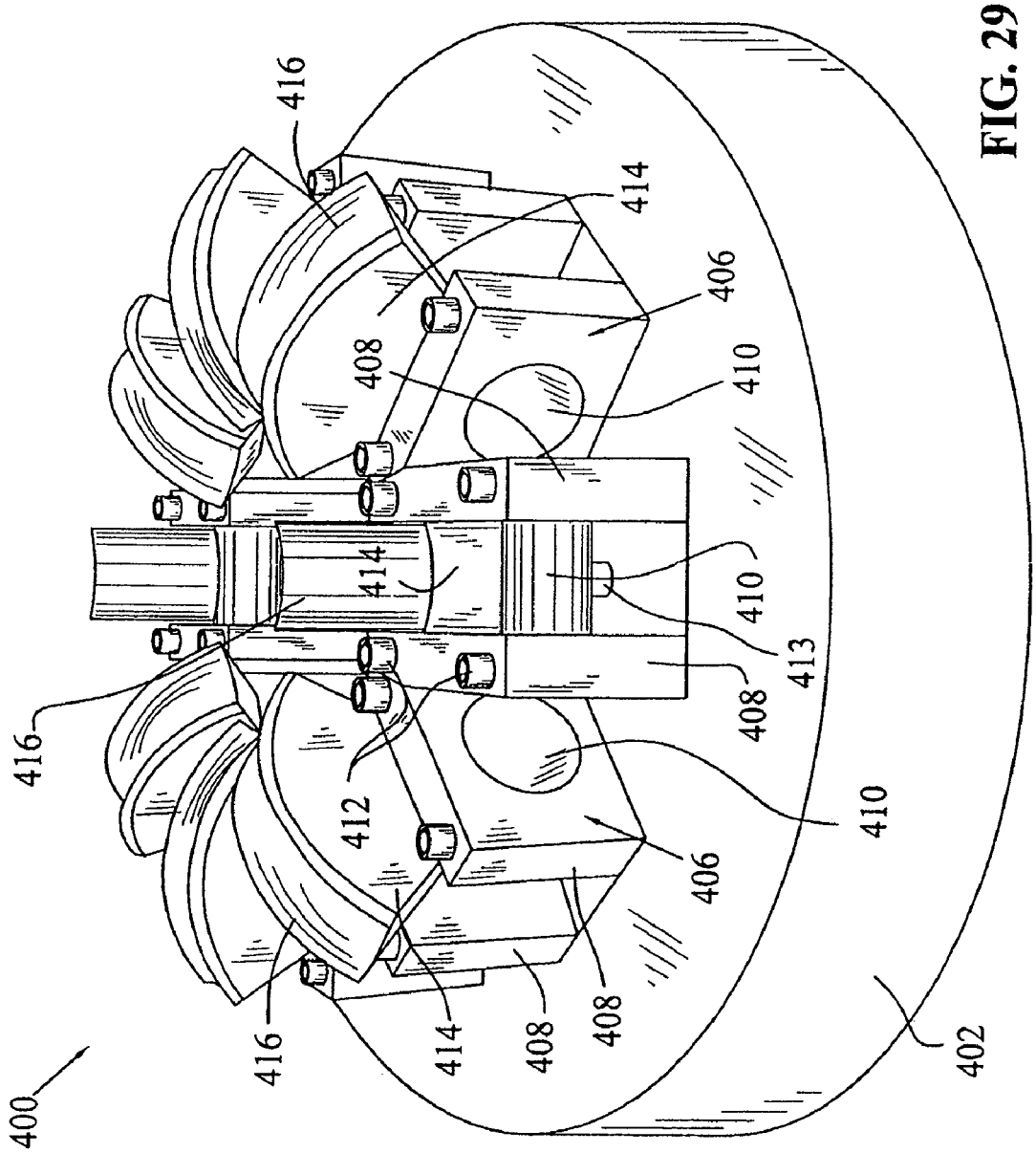
FIG. 29 shows a second perspective view of an embodiment of the shrinker illustrated in FIG. 28.

With reference now to FIGS. 4, and 28-29, yet another embodiment will be described. This method will comprise the mechanism of FIG. 4 and the shrinker mechanism 400 of FIG. 28-29. However, shrinker mechanism 400 will first be described.

With reference first to FIGS. 28 and 29, the shrinker apparatus 400 of the present invention will be described in greater detail. Shrinker 400 includes a base plate 402 having an aperture 404 extending substantially through the center. A plurality of compressing mechanisms, generally indicated by numeral 406, is attached to the upper surface of the base place 402. Each compressing mechanism 406 includes a pair of vertical walls 408 having an aperture extending substantially through the center. Further, the compressing mechanism 406 also includes an axial support 410 having a circular cross section and sized to be located within the apertures of the vertical walls 408. A plurality of mounting screws 412 affix the vertical walls 408 to the top surface of base plate 402. In the embodiment depicted, the mounting screws 412 are located proximate the four corners of the top surfaces of the compressing mechanism 406.

The compressing mechanisms 406 also include an additional mounting screw 413 extending through an aperture in the axial support 410 and into a compressing member 414. The compressing members 414, illustrated in this embodiment, take the general shape of a sector including two straight edges with an arcuate surface 416 extending therebetween, as best shown in FIG. 29. It should be noted that in the embodiment depicted, the arcuate surface includes an arcuate profile designed to conform to the outer surface of outer tube 4. However, in alternative embodiments, arcuate portion 416 may include a planar profile. As is depicted in FIGS. 28 and 29, the mounting screw 413 extends into the compressing member 414 and affixes the compressing member 414 to the axial support 410. Furthermore, the position of the compressing members depicted in FIG. 29 is the standard position of unloaded compressing members. In this embodiment, the compressing members 414 are weighted such that the compressing members 414 return to this position when not loaded.

The mechanism 150 of the FIG. 4 embodiment is usable with the shrinker 400 depicted in FIGS. 28 and 29, and the identical spinning mechanism 100 shown in FIGS. 7 and 8 according to the following processing. An outer tube 4 is first placed in the U-shaped holder 152, and the cylinders 162 first move the monolith substrates and mat material into their respective compression jaws 194. When the monolith substrates are laterally aligned within the compression jaws 194, the cylinder 190 is activated which causes a compression of the mat material surrounding the monolith substrate. Once again this compression and the time thereof is made in accordance with the selected compression sequence, that is, according to one of the illustrative curves $C_1$, $C_2$ or $C_3$.

When the mat material is compressed to its proper position, the cylinders 162 are again activated moving the monolith substrate through the tapered members 166 and into the outer tube. At this point, the loaded outer tube 4 and monolith members are moved to shrinker 400 depicted in FIGS. 28 and 29 and processed in the manner as discussed below. Once the loaded outer tube 4 and monolith members have been treated by shrinker 400, the loaded tube 4 is processed by the spinning device of FIGS. 7 and 8, or 9-14 to form the tube ends 30 or 32, and in a manner consistent with that set forth above. It should be appreciated that input/output data is again used in the manner as previously described with respect to the prior method.

FIGS. 30a-30d depict a plurality of section views of shrinker 400 during the operation of shrinking an outer tube 4 housing the monolithic substrate 6 and mat material 8. Starting first with FIG. 30a, the compressing members 414 begin in a position with arcuate surface 416 orientated upwards.

Figure 30A:
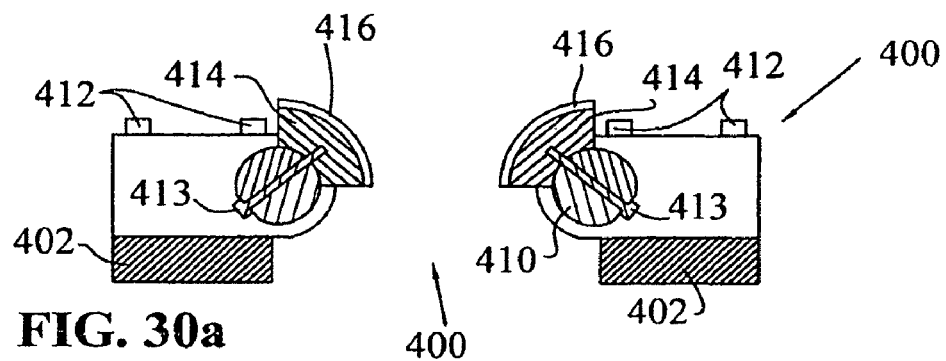
FIGS. 30a-30d show section views of the shrinker illustrated in FIGS. 28 and 29 compressing a tube in accordance with the present invention.
Figure 30B:
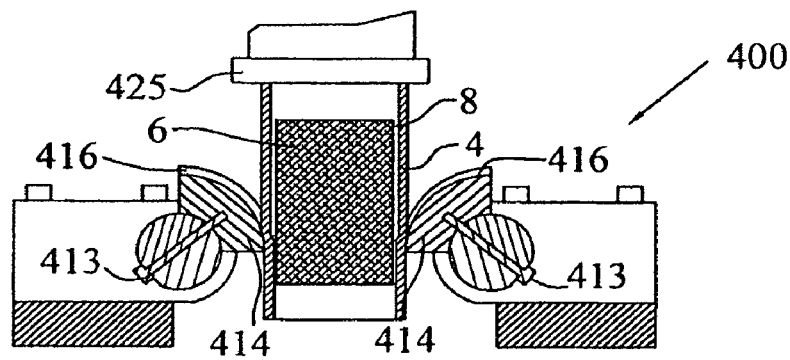

FIG. 30b depicts the first step in the operation of compressing the outer tube 4. The tube 4 is loaded into the shrinker 400 from the direction in which the arcuate surfaces 416 faces. It should be noted that the distance separating the compression members 414 through the center of aperture 404 is less than the pre-compressed outer diameter of outer tube 4.

Figure 30C:
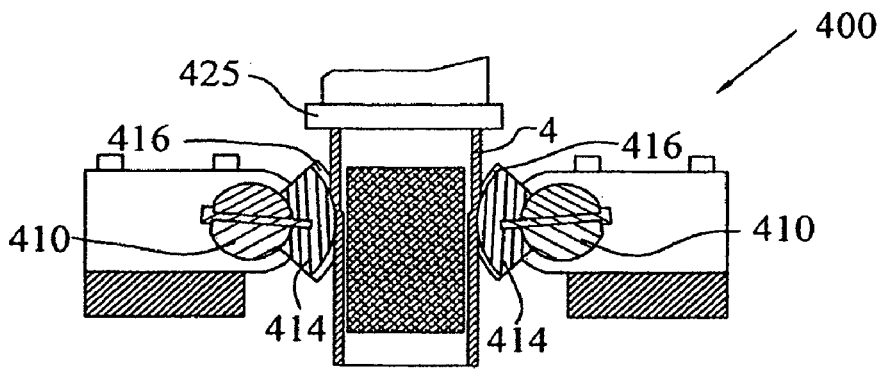

In FIG. 30c, a hydraulic or electromechanical plunger 425 drives the tube 4 through the shrinker 400. As is illustrated, the travel of the tube 4 through the shrinker 400 causes the compressing members 414 to rotate about axial support 410. In addition, arcuate surface 416 contacts the outer surface of the outer tube 4 thereby compressing the outer tube 4 and reducing the outer diameter thereof. It should be noted that during this compression step, the outer tube 4 is plastically deformed. However, as would be well known in the art, once the outer tube 4 has passed beyond the arcuate surface 416 such that the force on the outer tube 4 is no longer present, the outer tube 4 is no longer elastically deformed. In addition, it should be noted that at any given time, the compressing members 414 each contact the outer tube 4 only at distinct areas along the length of the outer tube 4. Consequently, a lesser force is required to shrink the outer tube 4 than would be required if the entire surface of the outer tube 4 were to be compressed along its entire length at one time.

Figure 30D:
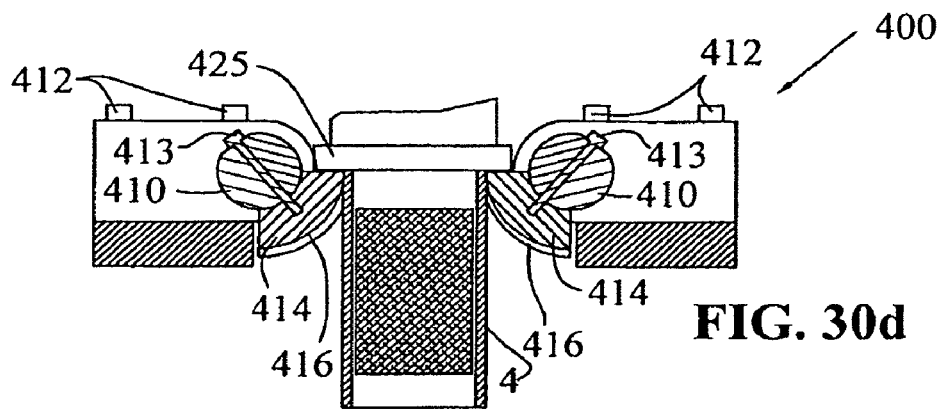

FIG. 30d depicts the outer tube 4 after passing entirely through shrinker 400. It should be noted that the outer diameter of the outer tube 4 is smaller than the outer diameter of the tube 4 prior to deformation. In addition, it should be noted that in the illustrated embodiment of the shrinker 400, the length of the outer tube 4 is limited in length to that of the arcuate surface 416. Following the compression established by the shrinker 400, the outer tube 4, the monolith substrate 6 and the mat material 8 is then removed for processing by the spinning apparatus, to define the tube ends 30, 32. Furthermore, in an embodiment of the invention, the compressing members 414 are weighted to return to the position depicted in FIG. 30a after the shrinking of the tube has been completed.

Figure 31:
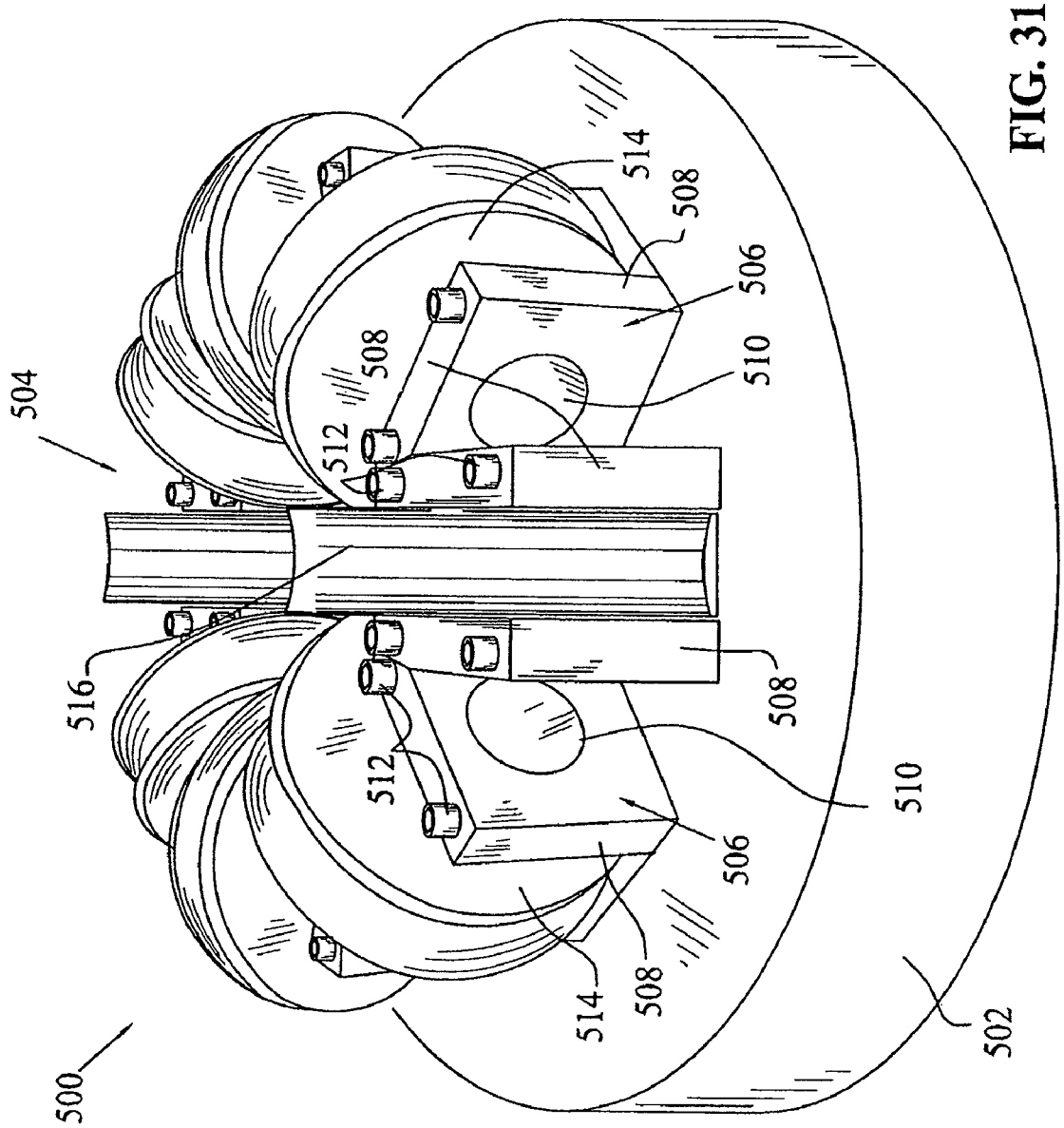
FIG. 31 shows a perspective view of an alternative embodiment of a shrinker in accordance with the present invention.

With reference now to FIG. 31, an alternative embodiment of the shrinker, generally indicated by numeral 500, will be described. In shrinker 500, a majority of components used therein are identical to those set forth above with regard to shrinker 400. However, rather than employing compression members 414 having a sector-shape (as depicted in FIGS. 28 and 29), shrinker 500 employs compression members 514 having a circular configuration, thereby allowing for shrinker 500 to process loaded tubes 4 with a length greater than that which may be processed by shrinker 400. In addition, shrinker 500 does not require mounting screw 413 to retain the compressing member 514 to the axial support 510. Rather the axial support 510 need only extend through an aperture (not shown) located in the center of the compressing member 514. In addition, axial support 510 differs from axial support 410 in that axial support 510 has a uniform circular cross section throughout and does not include an aperture, extending therethrough, for receiving mounting screw 413. Furthermore, as illustrated in FIG. 31, the height of vertical walls 508 in shrinker 500 is greater than vertical walls 408 of shrinker 400 ensuring the circular compressing member 514 is positioned above the top surface of base plate 402. In addition, the corresponding mounting screws 512 are also longer than the mounting screws 412 employed in shrinker 400.

Figure 32A:
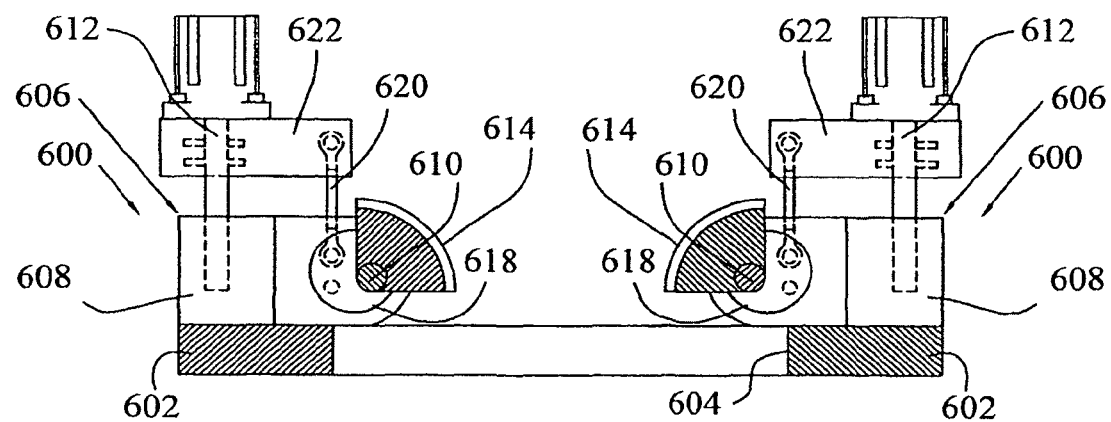
FIGS. 32a-32b show section views of another alternative embodiment of a shrinker in accordance with the present invention.
Figure 32B:
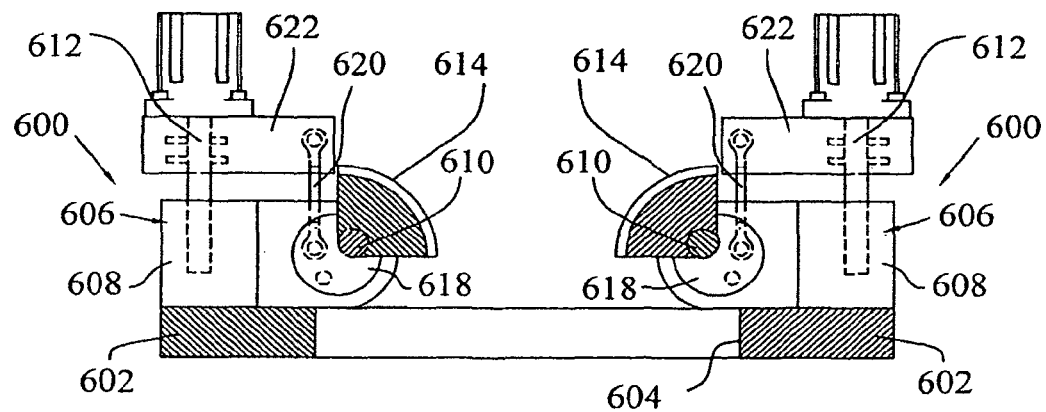

FIGS. 32a and 32b depict still an additional embodiment of a shrinker, generally indicated by numeral 600. Shrinker 600 allows for compression of loaded tubes 4, similar to that described above with respect to shrinker 400. Shrinker 600, however, allows the magnitude of compression upon a loaded tube 4 to vary. It should be noted that shrinker 600 comprises a design similar to that set forth above with respect to shrinker 400, illustrated in FIGS. 28 and 29. However, for the sake of simplicity and ease of description, only opposing compressing mechanisms 606 will be illustrated and described with the understanding that the features of shrinker 600 not described will be substantially similar to those of shrinker 400.

With respect first to FIG. 32a, shrinker 600 includes a base plate 602 with an aperture 604 extending through the center. A plurality of compressing mechanisms 606 is mounted to the top surface of base plate 602. Each compressing mechanism 606 includes a pair of spaced apart vertical walls 608 each having an aperture (not shown) extending therethrough.

In addition, each of the compressing mechanisms 606 utilized in this embodiment differ from those described above in that compressing mechanisms 606 include eccentric bushings 618, adjustment arm 620 and connecting plate 622. With this in mind, the structure of the compressing mechanism 606 will be described.

The eccentric bushing 618, including an aperture offset from the center of the bushing 618, is set within the aperture of the vertical walls 608 in a manner allowing for rotation therein. Axial support 610 extends through the aperture of the eccentric bushing 618 so that axial support 610 may rotate about its longitudinal axis. In a manner similar to that described above in previous embodiments, a compressing member 614 is joined to the axial support 610 by way of a mounting screw (not shown) so that the compressing member 614 rotates with the axial support 610.

The compressing mechanism 606 further includes an adjustment arm 620 and a connecting plate 622. Mounting screws 612 retain the connecting plate 622 in a position above the vertical walls 608. In addition, adjustment arm 620 connects connecting plate 622 with the eccentric bushing 618 in a manner requiring rotation of the bushing 618 when the distance separating the connecting plate 622 and the vertical wall 608 is altered. As depicted in FIGS. 32a-32b, any change in the distance separating vertical wall 608 and connecting plate 622 will change the vertical position of adjustment arm 620. Movement of the adjustment arm 620 will create rotation of eccentric bushing 618 within the aperture of vertical wall 608. As eccentric bushing 618 rotates, the position of axial support 610 changes both horizontally and vertically. This results in the alteration of the position of compressing members 614 thereby changing the separation distance between opposing compressing members 614 and varying the compression force. This structure provides a simple mechanism for controlling the magnitude of the compression of the loaded tube 4.

It should be noted that the adjustment mechanism described above may be replaced by any well known adjustment mechanism allowing for the alteration in magnitude of the compression of the outer tube 4. For example, an angled shim may be employed as a replacement for the eccentric bushing in order to provide an alternative method of altering the magnitude of the compression. Further, in additional embodiments, a dove tail configuration and a hydraulic cylinder may be used to alter the position of the compressing members 614. In addition, the compressing members 614 may also take on any desired shape that applies a compression force to discreet area of the tube 4.

Furthermore, it should also be noted that any embodiment of the adjustable shrinker 600 may be altered to allow for electronic adjustment of the magnitude of compression, wherein a controller (not shown) will electronically actuate the adjustment mechanism and increase or decrease the distance separating opposing compressing members as needed. In addition, in either the electronic controlled embodiment or the manually controlled embodiment, the shrinker may be joined to the gauging apparatus, described above. The gauging apparatus may then feed forward measurements of the mat material 8 and monolithic substrate 6 prior to loading the outer tube 4 and in order to accurately determine the proper compression load for each component manufactured by any of the above processes. This compression load data is then transmitted to the adjustable shrinker in order to allow the shrinker to be adjusted in order to supply a proper compression load in the shrinking step.

Thus, for any of the embodiments of the gauge members described above, 54, 154, or 254, the advantage is that the gauge station can measure the contraction or deformation to which the mat material is drawn, together with the force which is applied back to the gauge. As mentioned above, this force will be the same which is being exerted on the monolith itself. Thus, it is anticipated that the control mechanism 110 will have pre-loaded data for each mat material to be used, for example, the data similar to that of FIG. 24, and thus by gathering the data as mentioned above, and by comparison to the force curve, in order to achieve a certain force on the monolith, the added change in deformation will be known. As also mentioned above, the monolith substrates have a tolerance of +3 mm to −1 mm. It should be readily apparent why it is not acceptable to compress or deform the mat material and the monolith to a given diameter, as the variance of 4 mm in the diameter (that is, the tolerance range between the diameters of monolith substrates) being +3 mm to −1 mm) would lead to a drastic result in the force applied to the mat material and monolith substrate. The outer tube, monolith and mat material can thereafter be further radially compressed, by any of the spinning processes shown herein, or by the shrinking dies of FIGS. 20-22, or 28-32B.

It should be relatively apparent from the foregoing that the amount of deformation for each combination of mat material and monolith may be different. However, the method and apparatus described herein can accommodate every variation, and yet achieve the desired results of a given force or pressure on the monolith, with breakage.

What is claimed is:
1. An apparatus for use in compressing an outer tube during the manufacture of a catalytic converter comprising:
   a base plate including an aperture;
   a pushing member;
   a plurality of compressing mechanisms coupled to the base plate and positioned adjacent to the aperture, each including a compressing member having a plurality of rollers having an arcuate cross section in the longitudinal axis;

wherein the pushing member pushes the outer tube through the plurality of compressing members, and the compressing members sequentially provide a compression force at discreet areas of the outer tube until at least a portion of the length of the outer tube has been compressed as the outer tube passes through the aperture.

2. The apparatus as set forth in claim 1, wherein the outer tube is loaded with a combination of a mat material and a monolith substrate.

3. The apparatus as set forth in claim 2, wherein the compression members are profiled to radially deform the tube inwardly to compress the combination of the outer tube, the mat material and the monolith substrate.

4. The apparatus as set forth in claim 2, further comprising a gauging means for determining the pre-compression of the combination of the mat material and the monolith substrate as the outer tube is loaded.

5. The apparatus as set forth in claim 4, wherein the gauging means transmits a plurality of signals to a means for altering the level of compression in response to the plurality of signals.

6. The apparatus as set forth in claim 5, wherein the means for altering the level of compression in response to the plurality of signals includes a pair of eccentric bushings and an actuator connected to one of the eccentric bushings.

7. The apparatus as set forth in claim 5, wherein the means for altering the level of compression in response to the plurality of signals includes a pair of eccentric bushings, a connecting arm extending from one of the eccentric bushings to a plate housing, and a plurality of screws extending from the plate housing.

8. The apparatus as set forth in claim 7, wherein the plurality of rollers are arranged circumferentially around the outer tube.

9. The apparatus as set forth in claim 8, wherein the plurality of rollers are sector-shaped.

10. The apparatus as set forth in claim 8, wherein the plurality of rollers are circular.

11. An apparatus for use in compressing an outer tube during the manufacture of a catalytic converter, comprising:
a base frame portion;
a plurality of compressing mechanisms attached to the base frame portion, where each of the compressing mechanisms is comprised of a roller having an arcuately configured and convexly oriented cross-section defining arcuate compressing surfaces, where each roller is radially disposed about the base frame portion with the arcuate compressing surfaces defining a circular opening profiled for receiving the tube therethrough;
the rollers being profiled to sequentially provide a circular compression force at discreet areas of the outer tube to radially deform the outer tube inwardly to compress the outer tube against the internal structure of a catalytic converter, until at least a portion of the length of the outer tube has been compressed as the outer tube passes through the aperture.

12. The apparatus as set forth in claim 11, wherein the plurality of rollers are sector-shaped.

13. The apparatus as set forth in claim 12, wherein the sector-shaped rollers are profiled to return to a start position after the outer tube clears the rollers.

14. The apparatus as set forth in claim 13, wherein the plurality of sector-shaped rollers are weighted to provide a return to the start position.

15. The apparatus as set forth in claim 11, wherein the plurality of rollers are circular.

16. The apparatus as set forth in claim 11, further comprising a drive mechanism to drive the outer tube through the circular opening.

17. The apparatus as set forth in claim 16, wherein the drive mechanism is defined as a plunger, pushing the outer tube through the rollers.

18. The apparatus as set forth in claim 11, further comprising a gauging station for determining the fracture characteristics of internal structure of the catalytic converter comprised of a combination of a particular mat material with a particular monolith substrate.

19. The apparatus as set forth in claim 18, further comprising a control mechanism for gathering the data from the combination of the particular mat material with the particular monolith substrate and feeding the information to the compressing mechanisms.

20. The apparatus as set forth in claim 19, further comprising means for altering the level of compression.

21. The apparatus as set forth in claim 20, wherein the means for altering the level of compression includes a pair of eccentric bushings and an actuator connected to one of the eccentric bushings.

22. The apparatus as set forth in claim 20, wherein the means for altering the level of compression includes a pair of eccentric bushings, a connecting arm extending from one of the eccentric bushings to a plate housing, and a plurality of screws extending from the plate housing.

23. The apparatus as set forth in claim 11, further comprising walls attached to the base frame portion and flanking the rollers.

24. An apparatus for use in compressing an outer tube during the manufacture of a catalytic converter comprising:
a base member including an aperture;
a pushing member;
a plurality of rollers defining a constricted opening defined on the base member having a diameter less than that of the pre-compressed outer tube, each roller having an arcuately configured and convexly oriented cross-section defining arcuate compressing surfaces, where each roller is radially disposed about the base frame portion with the arcuate compressing surfaces defining the constricted opening profiled for receiving the tube therethrough;
wherein the pushing member pushes the outer tube through the constricted opening, and the constricted opening provides a compression force at discreet areas of the outer tube as the outer tube moves relative to the constricted opening until at least a portion of the length of the outer tube has been compressed as the outer tube passes through the aperture.

25. The apparatus as set forth in claim 24, wherein each of the rollers being profiled to sequentially provide a circular compression force at discreet areas of the outer tube to radially deform the outer tube inwardly to compress the outer tube against the internal structure of a catalytic converter, until at least a portion of the length of the outer tube has been compressed as the outer tube passes through the aperture.

26. The apparatus as set forth in claim 24, wherein the compression members are profiled to radially deform the tube inwardly to compress the outer tube.

* * * * *